United States Patent
Kao

(10) Patent No.: US 7,273,294 B2
(45) Date of Patent: Sep. 25, 2007

(54) OUTDOOR SOLAR ENERGY LAMP WITH LUMINESCENCE EFFICIENCY

(76) Inventor: Kuang-Hung Kao, No. 15, Lane 297, Sung Chiang Road, Taipei (TW)

( * ) Notice: Subject to any disclaimer, the term of this patent is extended or adjusted under 35 U.S.C. 154(b) by 0 days.

(21) Appl. No.: 11/340,200

(22) Filed: Jan. 26, 2006

(65) Prior Publication Data

US 2007/0171634 A1    Jul. 26, 2007

(51) Int. Cl.
*B60Q 1/00* (2006.01)
(52) U.S. Cl. ............... 362/192; 362/183; 362/396
(58) Field of Classification Search ............... 362/183, 362/800, 186, 363, 84, 192, 396
See application file for complete search history.

(56) References Cited

U.S. PATENT DOCUMENTS 6,974,228 B2 * 12/2005 Weiser et al. ............... 362/124
2003/0221377 A1 * 12/2003 Crawford et al. ............ 52/103
2006/0109647 A1 *  5/2006 Liu ........................... 362/183
2006/0133073 A1 *  6/2006 Nakata et al. .............. 362/192
2006/0227542 A1 * 10/2006 Richmond .................. 362/183

* cited by examiner

*Primary Examiner*—Ali Alavi
(74) *Attorney, Agent, or Firm*—Schmeiser, Olsen & Watts

(57) ABSTRACT

An outdoor solar energy lamp has at least one lighting unit and a solar energy battery unit electrically connected to the at least one lighting unit. Each lighting unit has a base, at least one light emitting diode (LED) on the base and a transparent cover mounted on the base and partially coated with luminescent material. By using the solar energy battery unit and the LED, the lamp is economical and efficient in use. Moreover, the luminescent material keeps the lamp on lighting after the solar energy battery unit is exhausted.

5 Claims, 4 Drawing Sheets

OUTDOOR SOLAR ENERGY LAMP WITH LUMINESCENCE EFFICIENCY

BACKGROUND OF THE INVENTION

1. Field of the Invention

The present invention relates to a lamp, and more particularly to an outdoor solar energy lamp that uses environmental solar energy as power source and has a luminescence function to prolong lamp lighting.

2. Description of the Prior Art

Conventional outdoor lamp is mostly operated by electrical energy that is presently provided by fossil fuels burning or nuclear power either generating pollutants to our environments. Moreover, the conventional outdoor lamp contains light bulbs used thereon and generating light and inevitable thermal energy. The thermal energy causes high temperature that is unfavorable to the light bulb because the high temperature certainly shortens the lifetime of the light bulb and results in energy waste so that cost of bulb replacement and energy supply is increased correspondingly.

Some conventional solar energy lamps have been known to have a battery that is charged up during daylight hours by solar radiation and which provide light at night in gardens and open spaces when required. Generally speaking, the conventional outdoor solar energy lamp does not have long lighting duration and the brightness is relative low that may be not satisfactory for special lightness requirement such as security purposes in spacious areas.

SUMMARY OF THE INVENTION

To the drawbacks of the conventional outdoor lamp and the conventional solar energy lamp, an improved solar energy lamp is provided in the present invention to eliminate or obviate the drawbacks.

A main objective of the present invention is to provide an outdoor solar energy lamp that not only is environmentally friendly but also has excellent lighting efficiency.

Another main objective of the present invention is to provide an outdoor solar energy lamp that has long lighting duration and lifespan.

To achieve the foregoing objectives, the outdoor solar energy lamp comprises:

an outdoor solar energy lamp with luminescence efficiency, the outdoor solar energy lamp comprising:

at least one lighting unit, each lighting unit having:

a base with at least one light emitting diode (LED); and a transparent cover mounted on the base to cover the at least one LED and luminescent material that illuminates without exterior energy; and a solar energy battery unit electrically connected to the at least one LED by a wire, turning solar energy into electric energy, saving the electric energy and providing the electric energy to the at least one LED. The transparent cover can be made of glass and the luminescent material is partially coated on a surface of the transparent cover or distributed in the glass.

By having the solar energy battery, LED and the luminescent material, the lamp enables to have a plurality of economical efficiency.

To facilitate understanding the purpose of the present invention and its characteristics and effects, a specific embodiment of the present invention is described in detail as follows according to the figures.

DESCRIPTION OF MAIN COMPONENTS

DETAILED DESCRIPTION OF THE INVENTION

An outdoor solar energy lamp with luminescence efficiency in accordance with the present invention comprises at least one lighting unit and a solar energy battery unit electrically connected to the at least one lighting unit. Each lighting unit has a base, at least one light emitting diode (LED) on the base and a transparent cover mounted on the base and partially coated with luminescent material. By using the solar energy battery unit and the LED, the lamp is economical and efficient in use. Moreover, the luminescent material keeps the lamp on lighting after the solar energy battery unit is exhausted.

Figure 1:
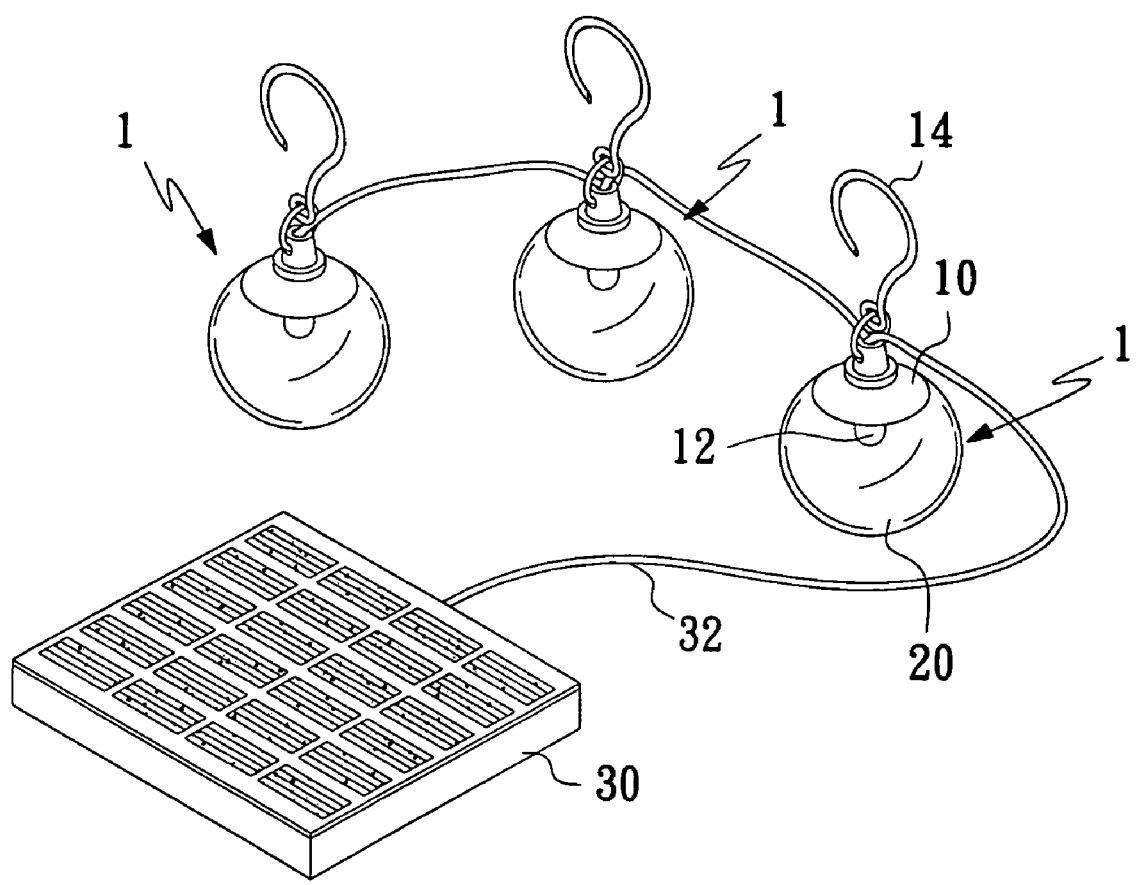
FIG. 1 is a perspective view of a first embodiment of an outdoor solar energy lamp in accordance with the present invention.
Figure 2:
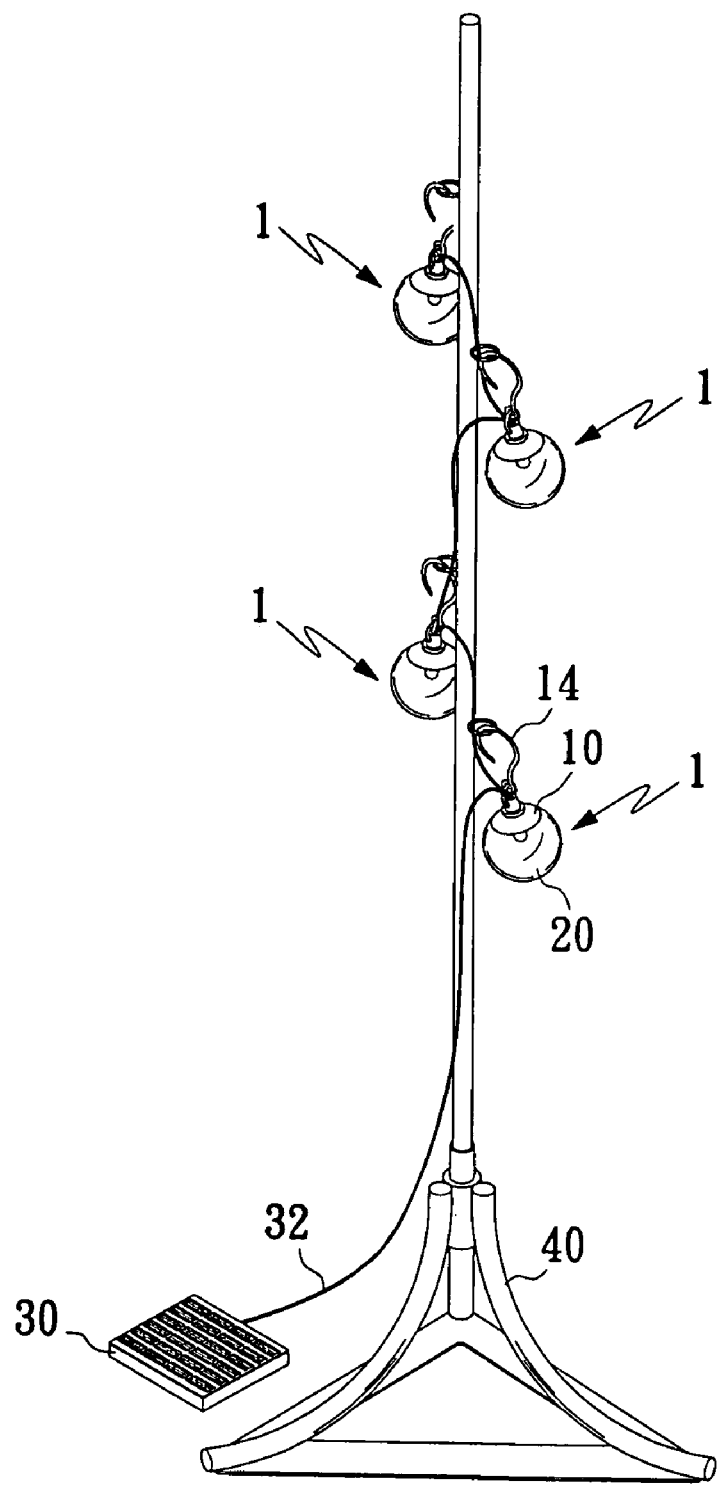
FIG. 2 is an operational perspective view of the first embodiment of the outdoor solar energy lamp in FIG. 1.

With reference to FIGS. 1 and 2, a preferred embodiment of the outdoor solar energy lamp with luminescence efficiency in the present invention comprises multiple lighting units 1 and a solar energy battery unit 40. Each lighting unit 1 has a base 10, an LED 12, an optional hook 14 and a transparent cover 20 with luminescent material.

The base 10 is dish-shaped and has a flat side, a tapered side, and a protrusion attached to the tapered side. The LED 12 is attached to the flat side of the base 10 and the hook 14 is engaged the protrusion on the base 10.

The transparent cover 20 is spherical and hermetically attached to the base 10 to prevent the LED 12 from dust and moisture. The transparent cover 20 is coated with a thin layer of the luminescent material on an inner periphery or an outer periphery thereof, wherein the thin layer of the luminescent material still allow light emitting through the coated transparent cover 20. The luminescent material absorbs light energy from solar radiation in daylight or the LED emission and releases the luminescence when the solar energy battery unit 30 is exhausted at night. Selectively, the transparent cover 20 is partially coated with the luminescent material in different patterns to create versatile lighting pictures at night.

The solar energy battery unit 30 is electrically connected to the multiple lighting units 1 by a wire 32. The solar energy battery unit 30 collects and saves the solar energy from the sunlight and provides the solar energy to the at least one lighting unit 1 to generate light at night.

When the outdoor solar energy lamp is in use, as shown in FIG. 2, the multiple lighting units 1 are attached to a stand 40 with multiple rings 42 by respectively attaching the hooks 14 to the rings 42 on the stand 40.

Figure 3:
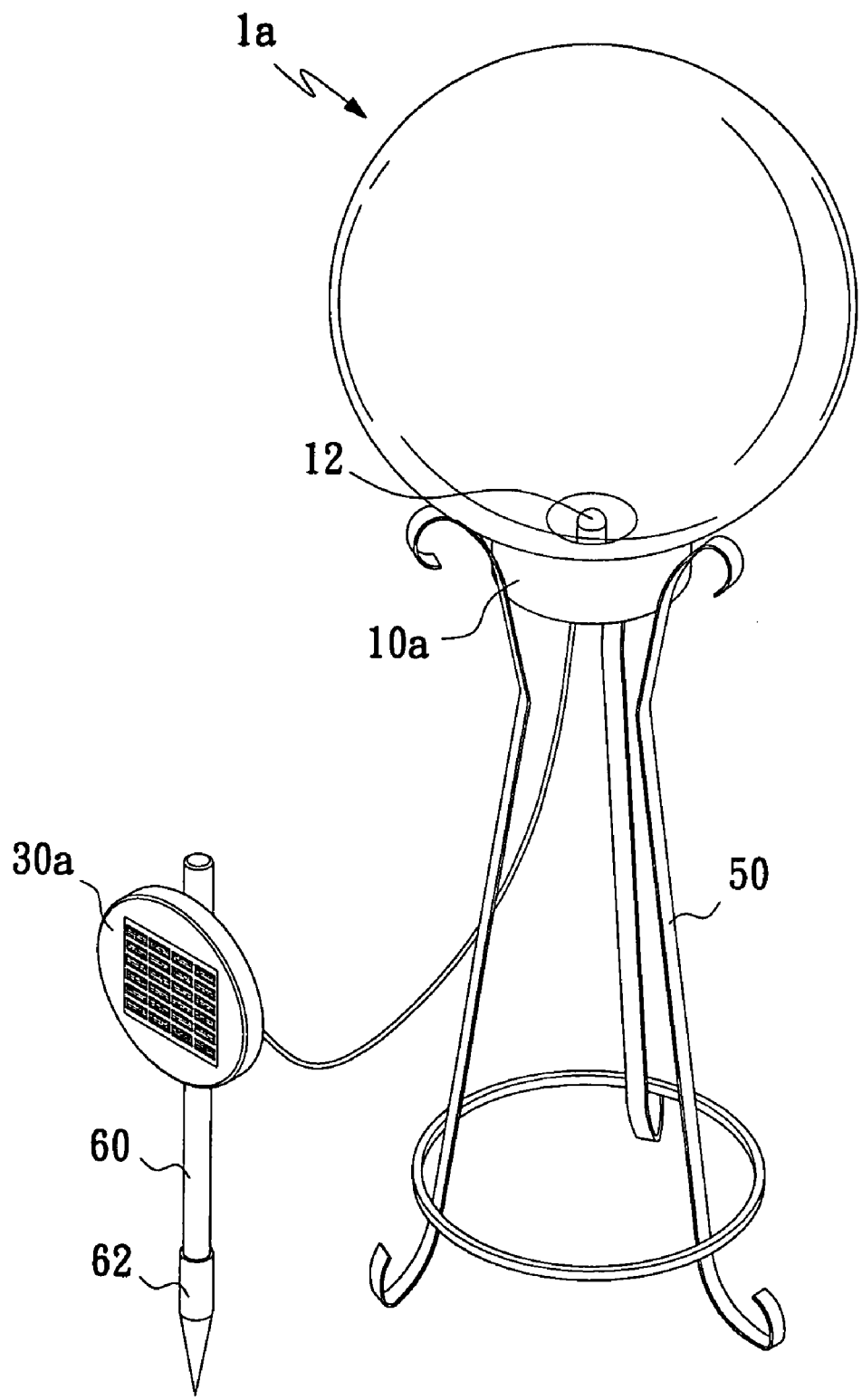
FIG. 3 is a perspective view of a second embodiment of the outdoor solar energy lamp in accordance with the present invention.

With reference to FIG. 3, another preferred embodiment of the outdoor solar energy lamp is shown, wherein the lighting unit 1*a* has an enlarged base 10*a* and a tripod supporting rack 50 for holding the enlarged base 10*a*. Moreover, the solar energy battery unit 30*a* is combined to a stick 60 with a sharp head 62 to upraise the battery unit 30a and to conveniently attach to the ground.

Figure 4:
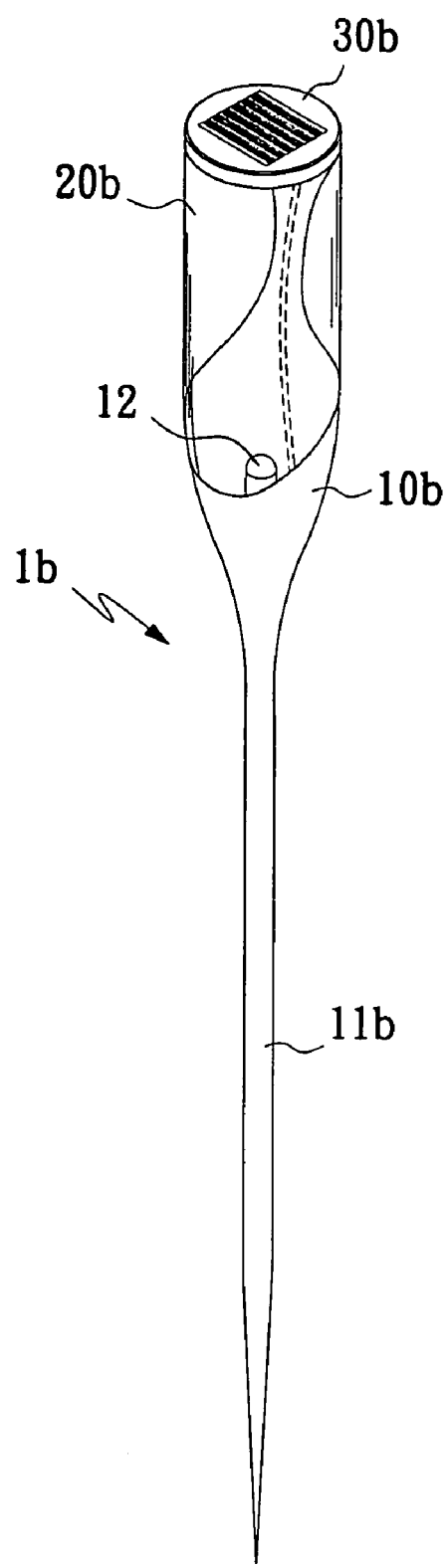
FIG. 4 is a perspective view of a third embodiment of the outdoor solar energy lamp in accordance with the present invention.

With reference to FIG. 4, still another preferred embodiment of the outdoor solar energy lamp is shown, wherein the lighting unit 1b is further modified by having a stick-shaped base 10b. The stick-shaped base 10b has an enlarged top end with the LED 12 and a sharp bottom end 11b. The transparent cover 20b is tubular and mounted on the enlarged top end. The solar energy battery unit 30b is mounted on a top of the transparent cover 20b.

According to the foregoing description, the outdoor solar energy lamp of the present invention has the following advantages:

1. By turning the sunlight energy into the electric energy, the solar energy lamp makes use of the electric energy costing no money to reduce the operational cost. Moreover, the solar energy is environmentally friendly to the earth.
2. The LED has excellent lighting efficiency, low energy consumption, and long longevity because the temperature of the LED is low. Therefore, the solar energy lamp is economical in use.
3. Every embodiment of the outdoor solar energy lamp can be conveniently constructed to utilize by means of hooks, stands or sticks.
4. The luminescent material enables the lamp to keep on lighting after the solar energy battery unit is exhausted so that lighting duration of the lamp is prolonged.

The present invention has been described with a preferred embodiment thereof and it is understood that many changes and modifications in the described embodiment can be carried out without departing from the scope and the spirit of the invention as defined by the appended claims.

What is claimed is:

1. An outdoor solar energy lamp with luminescence efficiency, the outdoor solar energy lamp comprising: at least one lighting unit, each lighting unit having a base with at least one light emitting diode (LED) wherein the base is dish-shaped and has a flat side, a tapered side, and a protrusion attached to the tapered side;

the at least one LED is attached to the flat side of the base; and the base further has a hook engaged with the protrusion on the base;

a transparent cover mounted on the base to cover the at least one LED and containing luminescent material that illuminates without exterior energy supply; and a solar energy battery unit electrically connected to the at least one LED, turning solar energy into electric energy, saving the electric energy and providing the electric energy to the at least one LED.

2. The outdoor solar energy lamp as claimed in claim 1, wherein the outdoor solar energy lamp further comprises a stand with at least one ring; and the hook on the base correspondingly engages one of the at least one ring on the stand.

3. The outdoor solar energy lamp as claimed in claim 1, wherein the outdoor solar energy lamp comprises:

one lighting unit;

a supporting rack holding the lighting unit; and a stick with a sharp head combined with the solar energy battery unit.

4. The outdoor solar energy lamp as claimed in claim 1, wherein the base is stick-shaped and has a sharp bottom end and an enlarged top end with the at least one LED;

the transparent cover is tubular and mounted on the enlarged top end of the base; and the solar energy battery unit is mounted on a top of the transparent cover.

5. The outdoor solar energy lamp as claimed in claim 1, wherein the transparent cover is made of glass and the luminescent material is partially coated on a surface of the transparent cover or distributed in the glass.

* * * * *